Figure 1:
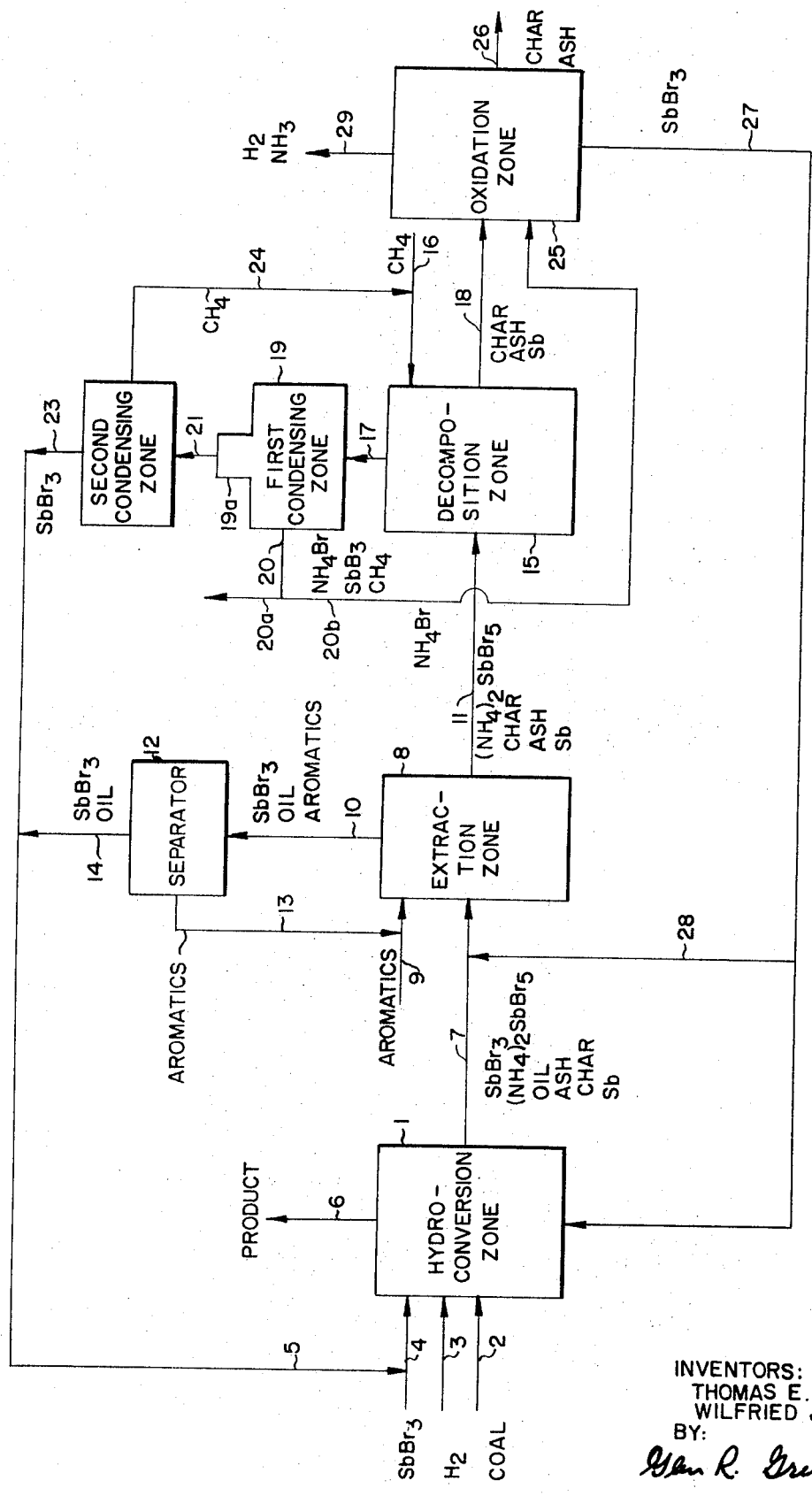

United States Patent
Kiovsky et al.

[15] 3,657,108
[45] Apr. 18, 1972

[54] REGENERATION OF METAL HALIDE CATALYST

[72] Inventors: Thomas E. Kiovsky, El Sobrante; Wilfried J. Petzny, Berkeley, both of Calif.

[73] Assignee: Shell Oil Company, New York, N.Y.

[22] Filed: Apr. 27, 1970

[21] Appl. No.: 31,982

[52] U.S. Cl. .............................................................. 208/10
[51] Int. Cl. ............................................................ C10g 1/06
[58] Field of Search ................... 208/10, 108; 252/413, 414

[56] References Cited

UNITED STATES PATENTS 3,542,665  11/1970  Wald ........................................ 208/10
3,355,376  11/1967  Gorin et al. ............................. 208/10
3,371,049  2/1968   Gorin et al. ............................. 208/10

Primary Examiner—Delbert E. Gantz
Assistant Examiner—Veronica O'Keefe
Attorney—Glen R. Gruenewald and Harold L. Denkler

[57] ABSTRACT

A process for regenerating metal halide catalysts deactivated in hydroconversion of nitrogen-containing feedstocks by the formation of metal halide-ammonium halide complexes is disclosed. Regeneration is effected by contacting the complex with an electron donor solvent for metal halide at conditions at which the solvent effects decomposition of the complex and separation of the resultant metal halide and ammonium halide decomposition products by dissolving the metal halide.

14 Claims, 2 Drawing Figures

REGENERATION OF METAL HALIDE CATALYST

BACKGROUND

It has been found that certain metal halides when employed as a continuous phase at temperatures in the range of 350° C and under hydrogen pressure are excellent catalysts for converting heavy hydrocarbons and similar materials such as coal into useful low boiling hydrocarbons such as gasoline. Typical of these metal halides are antimony tribromide, antimony triiodide, zinc chloride, zinc bromide, zinc iodide, mercuric iodide, cadmium iodide, gallium bromide, bismuth tribromide, bismuth triiodide, tin chloride, tin bromide, tin iodide and arsenic iodide.

Most of the above-mentioned metal halides are excellent catalysts that resist deactivation by such materials as sulfur and oxygen that are bound in organic molecules found in many materials that may be converted by such a process, and by their reaction products, and additionally the metal halide catalysts are not deactivated by ash that is found in coal, coke or char that results from high temperature reactions of the charge, metals such as nickel and vanadium that are found in residual petroleum fractions, and other such materials. However, the metal halide catalysts are deactivated by ammonia formed by hydrogenation of organically bound nitrogen found in many feeds to such a process, especially in coal. Deactivation by ammonia has been found to be partly due to the formation of stable ammonium halide-metal halide complexes having the general formula $(NH_4)_a MX_b$ where X is a halogen, M is a metal, and $a$ and $b$ are whole numbers.

Although the complex is not literally a catalyst poison, it causes a loss of catalyst activity by dilution and by removing the metal halide from the bulk material as an active catalytic agent. A continuous phase metal halide catalyst can function with a large quantity of complex in it, but as the complex builds up to significant quantities, the catalyst activity drops off.

Regeneration of the metal halide catalyst by recovering the metal halide from the complex is important if a continuous conversion process is to be economically effected. Prior attempts to restore the metal halide involved oxidation of the ammonium portion of the complex to water and nitrogen whereby the metal halide was released from the complex. However, this is a high temperature process and it is difficult to effect as well as being accompanied by undesirable side reactions.

THE INVENTION

This invention includes the discovery that decomposition of the ammonium halide-metal halide complex and separation of the metal halide may be accomplished readily and almost completely by contacting the complex with an electron donor solvent, that is, a solvent that has an unshared electron pair, which solvent not only causes decomposition of the complex into ammonium halide and metal halide but effects separation of the metal halide from the ammonium halide by selectively dissolving the metal halide. Examples of such electron donor solvents are ketones, nitriles, ethers, alcohols, esters, glycols, organic acids, heteroatomic petroleum fractions such as pitch, mixtures rich in polynuclear aromatics such as heavy gas oils derived from petroleum or coal, and mixtures such as benzene-methanol and diethylether-methanol.

The efficiency of an electron donor solvent in this invention, both with regard to the amount of complex that may be converted and the rate of conversion, appears to be related to the asymmetry and polarity of the solvent molecules and to the temperature of contact between the complex and the solvent. Oxygen-containing solvents such as acetone, methylethyl ketone and methanol quickly effect decomposition of the complex at relatively low temperature. Less heteroatomic materials such as pitch and heavy gas oils are not as effective as the oxygenated solvents, but they can be used at substantially higher temperatures to obtain equivalent results, and the resultant solution of metal halide in pitch or gas oil may be charged directly to a hydroconversion zone thereby avoiding the need to separate metal halide from solvent and solvent losses.

Although the essence of the invention is contacting the ammonium halide-metal halide complex with an electron donor solvent to cause decomposition of the complex and separation of the metal halide from the resultant ammonium halide, various preferred embodiments of the invention refine the basic reaction to make it much more efficient and economical. In some embodiments it has been found that the electron donor solvent may be used much more efficiently if the catalyst from the hydrotreating zone is first extracted with aromatics to remove metal halide that has not been complexed and oil from the reaction zone before the catalyst stream is contacted with the electron donor solvent. Such initial extraction removes metal halide and oil from the catalyst stream and returns it directly to the reaction zone while only that portion of the stream from the hydroconversion zone representing impurities such as the ammonium halide-metal halide complex, ash, char, metals, etc., is subjected to contact with the electron donor solvent.

Another advantageous embodiment of this invention is reacting the ammonium halide separated from the complex to form hydrogen halide and ammonia. Hydrogen halide is an oxidizing agent that may be employed in the hydroconversion zone to prevent reduction of metal halide to metal or it may be employed in a separate oxidizing zone to oxidize reduced metal to the metal halide which may be returned to the reaction zone. In decomposing ammonium halide to form hydrogen halide, ammonia is also formed and it may be recovered as a separate product.

Following are several examples which illustrate the process of the present invention and are presented here as illustrative of the invention without intending to limit its scope. In all cases, the metal halide was employed to hydroconvert Illinois No. 6 coal or Big Horn coal into clean hydrocarbons boiling largely in the gasoline boiling range and being substantially free of oxygen, nitrogen, sulfur, and metal impurities as well as being separated from the ash that was contained in the coal. The reaction is effected by introducing finely ground coal into a continuous phase metal halide melt within a reaction zone while under hydrogen pressure and recovering from the reaction zone the normally liquid hydrocarbons produced as well as various vapor phase materials including normally gaseous hydrocarbons, hydrogen sulfide, water vapor, ammonia and hydrogen gas. The coal may be slurried in pitch or other hydroconvertible liquid or in recycle salt. Ideally, the hydrogen gas is separated from the other vapor phase materials and returned to the reaction zone while the hydrocarbon product is separated from the water, hydrogen sulfide and ammonia impurities, separated into fractions and employed or further treated as appropriate.

In the conversion of coal as above indicated, some of the ammonia reacts with the metal halide to form an ammonium halide-metal halide complex that represents both a loss of catalyst and a dilution of the catalyst so that the catalyst activity ultimately is affected when significant amounts of the complex are present. Additionally, solids resulting from the reaction, typically ash from the coal and char from unconvertable carbonaceous materials in the coal accumulate in the liquid phase catalyst and these materials also reduce catalyst activity by dilution. In order for a continuous hydroconversion process to be effected it is necessary that the catalyst be removed from the continuous phase and fresh metal halide be added to the continuous phase, and for the process to be economical it is necessary for the metal halide to be recovered from the complex and returned to the hydroconversion zone. The following table is provided to illustrate the conditions under which such regeneration may be effected.

It may be seen from the table that a wide variety of electron donor solvent may be used to convert ammonium bromide-antimony bromide complex to antimony tribromide and ammonium bromide. In all cases the antimony tribromide is soluble in the solvent and is separated from insoluble ammonium

| Complex | Solvent | Temperature, °C. | Conversion, mole percent | Solvent/complex weight ratio |
|---|---|---|---|---|
| $(NH_4)_2SbBr_5$ | Acetone | 56.2 | 70.7 | 1.2 |
| $(NH_4)_2SbBr_5$ | Methyl ethyl ketone | 79.6 | 68.7 | 2.5 |
| $(NH_4)_2SbBr_5$ | Methanol | 25 | 75 | 3.0 |
| $(NH_4)_2SbBr_5$ | Methanol-diethylether | 25 | 75 | 3.0 |
| $(NH_4)_2SbBr_5$ | Tetrahydrofuran | 64 | 100 | 8.9 |
| $(NH_4)_2SbBr_5$ | Acetonitrile | 80.1 | 70.4 | 31.4 |
| $(NH_4)_2SbBr_5$ | Benzonitrile | 190.7 | 100 | 25 |
| $(NH_4)_2SbBr_5$ | West Texas flasher pitch | 350–390 | 60.2 | 3.0 |
| $(NH_4)_2SbBr_5$ | Catalytic cracked gas oil | 270–280 | 46.8 | 38 |
| $(NH_4)_2SbBr_5$ | Coker gas oil | 260–270 | 40.5 | 38 |
| $(NH_4)_2SbBr_5$ | do | 270–305 | 45.7 | 43 |
| $(NH_4)_2ZnBr_4$ | Acetone | 56.2 | 40.8 | 7.7 |
| $(NH_4)_2ZnBr_4$ | Methyl ethyl ketone | 79.6 | 52.3 | 8.4 |
| $(NH_4)_2ZnCl_4$ | Acetone | 56.2 | 25.9 | 7.7 | bromide upon decomposition of the complex. It may also be pointed out that the wide variations in weight ratio between solvent and complex are not as significantly different on a mole basis because the heavy hydrocarbon fractions used have a relatively high molecular weight compared to the oxygen-containing solvents reported in the table. The use of large quantities of material that is going to be charged to the hydroconversion process is not detrimental because a subsequent separation of antimony bromide from solvent is not necessary.

The table also illustrates that the process of this invention is effective to decompose other ammonium halide-metal halide complexes. Equivalent but not identical results are obtained with other metal halides such as zinc iodide, cadmium iodide, bismuth bromide or iodide and others.

The process of the present invention may be best describe with reference to the accompanying drawings which are highly schematic flow diagrams of processes embodying this invention. The flow diagrams employ boxes illustrating various functions and no attempt is made to show valves, controls, vessel or other conventional equipment ordinarily employed for effecting the various functions defined.

Figure 2:
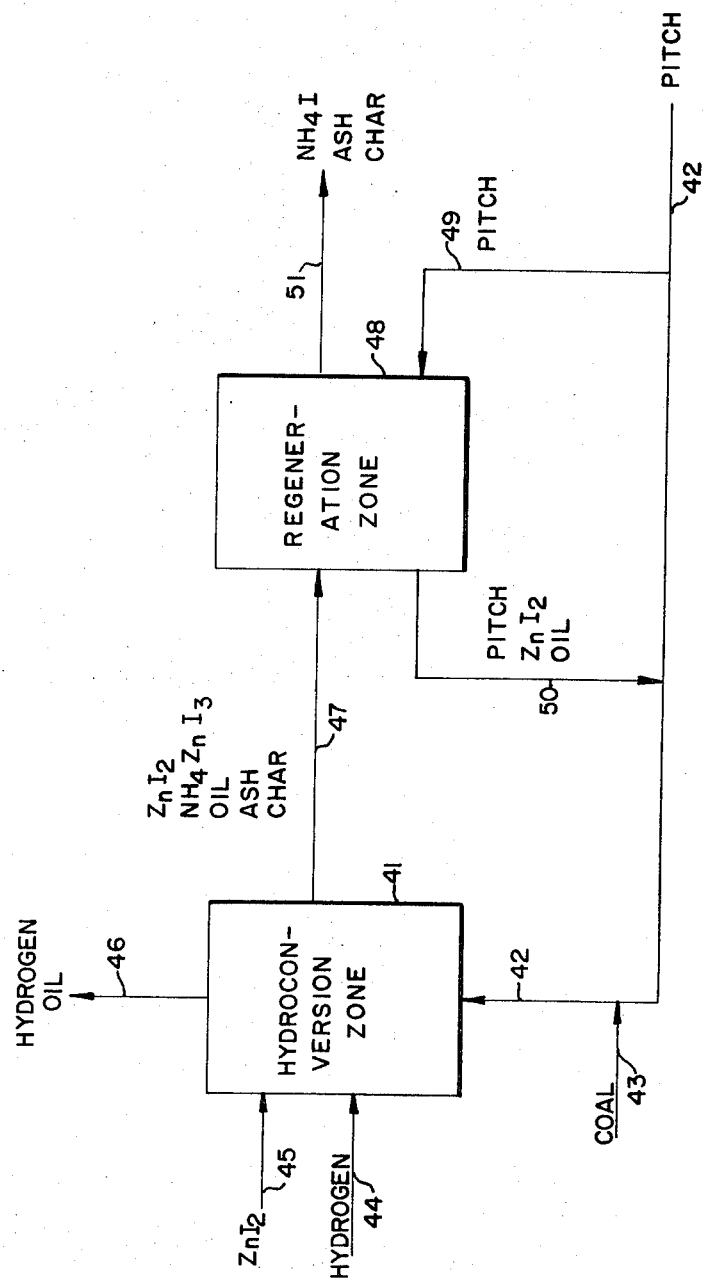

FIG. 1 is a flow diagram of a process embodying this invention employing a circulating solvent that is not hydroconverted, while FIG. 2 is a flow diagram of a process employing a once-through solvent.

Referring to FIG. 1 a process for hydroconversion of coal to liquid hydrocarbons is described employing antimony tribromide as a catalyst. The process illustrated in the drawing is effected by maintaining a continuous phase of antimony tribromide in hydroconversion zone 1 and adding coal through line 2 and hydrogen through line 3 as charge to the hydroconversion zone. After a continuous phase of catalyst is introduced into hydroconversion zone 1, only irretrievable losses of fresh catalyst are introduced through line 4 to maintain the catalyst capacity of the system while recycle material including antimony tribromide is returned to hydroconversion zone 1 from downstream processing via line 5 and line 4. The hydroconversion of coal effected in zone 1 results in the production of liquid hydrocarbons which are removed through line 6 along with hydrogen and other vapor phase materials produced in the process such as water, ammonia and hydrogen sulfide.

To maintain the catalyst activity a portion of the liquid phase material in hydroconversion zone 1 is withdrawn through line 7 and passed directly, or indirectly, to extraction zone 8. The material in line 7 includes antimony tribromide catalyst and oil which are necessarily withdrawn from hydroconversion zone 1 in that separation of various materials from one another cannot be adequately effected therein, as well as ammonium bromide-antimony bromide complex, ash, char, and perhaps some antimony metal if conditions in the hydroconversion zone are such that antimony tribromide is reduced. As will be discussed hereinafter, when antimony metal is present in the material in line 7 an alternative processing route may be taken, but when antimony metal is not present in the material, line 7 discharges into extraction zone 8.

In extraction zone 8 the material from line 7 is contacted with a stream of aromatics or other suitable solvent for antimony tribromide and oil introduced through line 9. This solvent is not for the purpose of decomposing the complex but for selectively dissolving antimony tribromide and oil. The extracted material passes from separation zone 8 through line 10. The material not extracted which includes ammonium bromide-antimony bromide complex, ash, and char is removed from extraction zone 8 through line 11. The antimony bromide, oil and aromatic mixture in line 10 passes into separation zone 12 where a simple fractionation separates the aromatics from the antimony tribromide and oil, the latter materials being passed to line 5 and ultimately returned to hydroconversion zone 1 while the aromatics pass through line 14 into line 9 and are returned to extraction zone 8.

The material in line 11 passes to regeneration zone 15 wherein it is contacted in one or more stages with an electron donor solvent such as acetone introduced through line 16. The electron donor solvent decomposes the ammonium bromide-antimony bromide complex and dissolves the antimony bromide. The undissolved ammonium bromide, ash and char are withdrawn from regeneration zone 15 through line 17. The solution of antimony bromide in the acetone solvent is withdrawn from zone 15 through line 18 and introduced into separation zone 19 in which separation of the acetone from the antimony bromide may be effected by fractionation. The antimony bromide resulting from the decomposition of the complex in regeneration zone 15 is passed from separator 19 through line 20 into line 5 and ultimately returned to hydroconversion zone 1 while the acetone is removed through line 21 and returned to regeneration zone 15 for further contact with the complex.

For the most part, the process of the present invention is successfully completed at this point and the material in line 17 may be discarded or the ammonium bromide recovered for some other use. However, a particularly advantageous modification of the process is to introduce the material from line 17 into a stripper 22 where the material is heated and a stripping gas shown herein as methane is introduced through line 23 to strip the ammonium bromide from the ash and char. The ash and char are removed through line 24 to be disposed of while ammonium bromide and methane stripping gas are passed through line 25 into decomposition zone 26. Methane is separated from ammonium bromide and returned via line 29 into line 23 to effect further stripping of ammonium bromide in zone 22 while a suitable reactant, shown here as sulfuric acid, is introduced into zone 26 through line 27 wherein it reacts with ammonium bromide to produce ammonium sulfate and hydrogen bromide. The hydrogen bromide is withdrawn from zone 26 through line 28 and introduced into line 5, and ultimately into hydroconversion zone 1 unless the aforementioned alternative to deal with antimony metal is employed and the ammonium sulfate produced in zone 26 is removed through line 30.

The hydrogen bromide produced in zone 26 preferably is introduced directly into hydroconversion zone 1 wherein its oxidizing effect prevents the formation of antimony metal by preventing reduction of the antimony bromide. However, if the presence of hydrogen bromide in the hydroconversion zone is undesirable for some reason, such as increasing the catalyst activity to too great an extent, it may be used to oxidize any antimony metal that might be formed in the hydroconversion zone. When antimony metal is formed in the hydroconversion zone it will pass from zone 1 through line 7 and, as shown with broken lines, the stream from line 7 may be passed through line 31, oxidizing zone 32, and line 33 to return it to line 7 and introduction into extraction zone 8. The materials in line 31 are contacted in oxidation zone 32 with hydrogen bromide that is generated in zone 26 and introduced into zone 32 through line 34. In oxidation zone 32 the antimony metal present in the material passing from hydroconversion zone 1 is oxidized to antimony tribromide with the evolution of hydrogen that is released through line 35. The resultant material from zone 32 is passed through line 33 and ultimately into extraction zone 8 wherein it is treated as hereinbefore described. The hydrogen generated in zone 32 is passed through line 35 and either returned to the process or otherwise disposed of. Oxidation of antimony metal may also be effected by contacting it with ammonium bromide or with the antimony bromide-ammonium bromide complex under appropriate conditions.

FIG. 2 illustrates a particularly advantageous embodiment of this invention that may be employed if pitch or other heavy liquid phase material is a portion of the charge and an electron donor solvent as well. In FIG. 2 a hydroconversion zone 41 is charged with pitch and coal through lines 42 and 43, respectively, hydrogen through line 44 and zinc iodide catalyst through line 45. Again it is contemplated that line 45 will supply only irretrievable losses of catalyst.

Hydrogen and product are withdrawn from hydroconversion zone 41 through line 46 and a slipstream of the liquid catalyst phase is withdrawn through line 47. Line 47 will carry a mixture including zinc iodide catalyst, oil, ammonium iodide-zinc iodide complex, ash, and char.

Line 47 discharges into regeneration zone 48 wherein its contents are contacted with a stream of pitch passing from line 42 through line 49. As a result of the contact of the pitch and the material in zone 48, the complex is decomposed, the zinc iodide in zone 48 is dissolved in the pitch, the oil is dissolved in the pitch, and the undesired ash, char and ammonium iodide are rejected from the pitch phase and removed through line 51. The pitch, carrying dissolved oil and zinc iodide in it, is passed through line 50 and returned to the charge stream in line 42. It will usually be desirable to separate ammonium iodide from the stream in line 51 and to employ it as such or decompose it to ammonia and hydrogen iodide, the latter product being returned to hydroconversion zone 41.

We claim as our invention:

1. The process for regenerating metal halide from metal halide-ammonium halide complex which comprises contacting the complex with an electron donor solvent for metal halide at a temperature below the thermal decomposition temperature of the metal halide but at which chemical reaction with the solvent causes said complex to decompose whereby the complex decomposes and metal halide is preferentially dissolved in the solvent and at least partly separated from the resultant ammonium halide decomposition product.

2. The process of claim 1 wherein the electron donor solvent is a ketone.

3. The process of claim 1 wherein the electron donor solvent is an ester.

4. The process of claim 1 wherein the electron donor solvent is an alcohol.

5. The process of claim 1 wherein the electron donor solvent is a nitrile.

6. The process of claim 1 wherein the electron donor solvent is an ether.

7. The process of claim 1 wherein the electron donor solvent is an organic acid.

8. The process for hydroconversion of a nitrogen-containing carbonaceous material which comprises contacting the carbonaceous material with a continuous phase of a molten metal halide catalyst at conversion conditions and under hydrogen pressure in a hydroconversion zone, withdrawing a portion of the molten catalyst containing metal halide, ammonium halide complex from the hydroconversion zone and contacting it with an electron donor solvent for metal halide at a temperature below the thermal decomposition temperature but at which chemical reaction with the solvent causes said complex to decompose whereby the complex decomposes and the metal halide is preferentially dissolved in the solvent and at least partly separated from the resultant ammonium halide decomposition product.

9. The process of claim 8 wherein the electron donor solvent is a heavy liquid hydrocarbon fraction, and the solvent with metal halide dissolved therein is introduced into the hydroconversion zone.

10. The process of claim 9 wherein the electron donor solvent is pitch.

11. The process of claim 8 wherein the ammonium halide is converted to ammonia and hydrogen halide, and hydrogen halide is introduced into the hydroconversion zone.

12. The process of claim 1 wherein the metal halide is zinc halide.

13. The process of claim 1 wherein the metal halide is zinc chloride.

14. The process of claim 1 wherein the metal halide is zinc iodide.

* * * * *